(12) United States Patent
Lee et al.

(10) Patent No.: US 11,544,479 B2
(45) Date of Patent: Jan. 3, 2023

(54) METHOD AND APPARATUS FOR CONSTRUCTING TRANSLATION MODEL INSTALLED ON A TERMINAL ON THE BASIS OF A PRE-BUILT REFERENCE MODEL

(71) Applicant: ELECTRONICS AND TELECOMMUNICATIONS RESEARCH INSTITUTE, Daejeon (KR)

(72) Inventors: Yo Han Lee, Siheung-si (KR); Young Kil Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 259 days.

(21) Appl. No.: 16/751,764

(22) Filed: Jan. 24, 2020

(65) Prior Publication Data

US 2020/0250384 A1 Aug. 6, 2020

(30) Foreign Application Priority Data

Feb. 1, 2019 (KR) .......................... 10-2019-0013591

(51) Int. Cl.
*G06F 40/58* (2020.01)
*G06N 3/08* (2006.01)
(Continued)

(52) U.S. Cl.
CPC .......... *G06F 40/58* (2020.01); *G06F 16/9027* (2019.01); *G06F 17/16* (2013.01);
(Continued)

(58) Field of Classification Search
CPC ...... G06F 40/58; G06F 16/9027; G06F 17/16; G06F 17/18; G06F 40/44; G06F 16/3337;
(Continued)

(56) References Cited

U.S. PATENT DOCUMENTS 5,228,113 A * 7/1993 Shelton .................. G06N 3/084
706/25
9,292,493 B2 * 3/2016 Chandramouli ........ G06F 40/30
(Continued)

FOREIGN PATENT DOCUMENTS

KR 10-2016-0134019 A 11/2016
KR 10-2018-0037558 A 4/2018

OTHER PUBLICATIONS

Geoffrey Hinton et al., "Distilling the Knowledge in a Neural Network", Mar. 9, 2015.

*Primary Examiner* — Michael N Opsasnick
(74) *Attorney, Agent, or Firm* — LRK Patent Law Firm

(57) ABSTRACT

Provided are a method and apparatus for constructing a compact translation model that may be installed on a terminal on the basis of a pre-built reference model, in which a pre-built reference model is miniaturized through a parameter imitation learning and is efficiently compressed through a tree search structure imitation learning without degrading the translation performance. The compact translation model provides translation accuracy and speed in a terminal environment that is limited in network, memory, and computation performance.

11 Claims, 4 Drawing Sheets

(a) TRANSLATION MODEL  (b) REFERENCE MODEL

(51) Int. Cl.
  *G06F 17/16* (2006.01)
  *G06F 16/901* (2019.01)
  *G06F 17/18* (2006.01)
  *G06F 40/44* (2020.01)

(52) U.S. Cl.
  CPC ............. *G06F 17/18* (2013.01); *G06F 40/44* (2020.01); *G06N 3/082* (2013.01)

(58) Field of Classification Search
  CPC .... G06N 3/082; G06N 3/0445; G06N 3/0472; G06N 3/063; G06N 3/08
  See application file for complete search history.

(56) References Cited

U.S. PATENT DOCUMENTS

| | | |
|---|---|---|
| 10,089,979 B2 | 10/2018 | Chung et al. |
| 2003/0083757 A1* | 5/2003 | Card .................... G05B 13/027 700/36 |
| 2007/0282772 A1* | 12/2007 | Lee ......................... G06N 3/02 706/25 |
| 2013/0138428 A1* | 5/2013 | Chandramouli ........ G06F 40/40 704/9 |
| 2015/0379429 A1* | 12/2015 | Lee ....................... G06N 20/00 706/11 |
| 2015/0379430 A1* | 12/2015 | Dirac .................... G06N 20/00 706/12 |
| 2017/0148431 A1* | 5/2017 | Catanzaro ............... G10L 25/18 |
| 2017/0148433 A1* | 5/2017 | Catanzaro ............. G10L 15/183 |
| 2018/0197084 A1 | 7/2018 | Kim et al. |
| 2019/0130248 A1* | 5/2019 | Zhong ..................... G06N 5/04 |
| 2020/0104395 A1* | 4/2020 | Bhatia ................. G06N 3/0454 |

\* cited by examiner

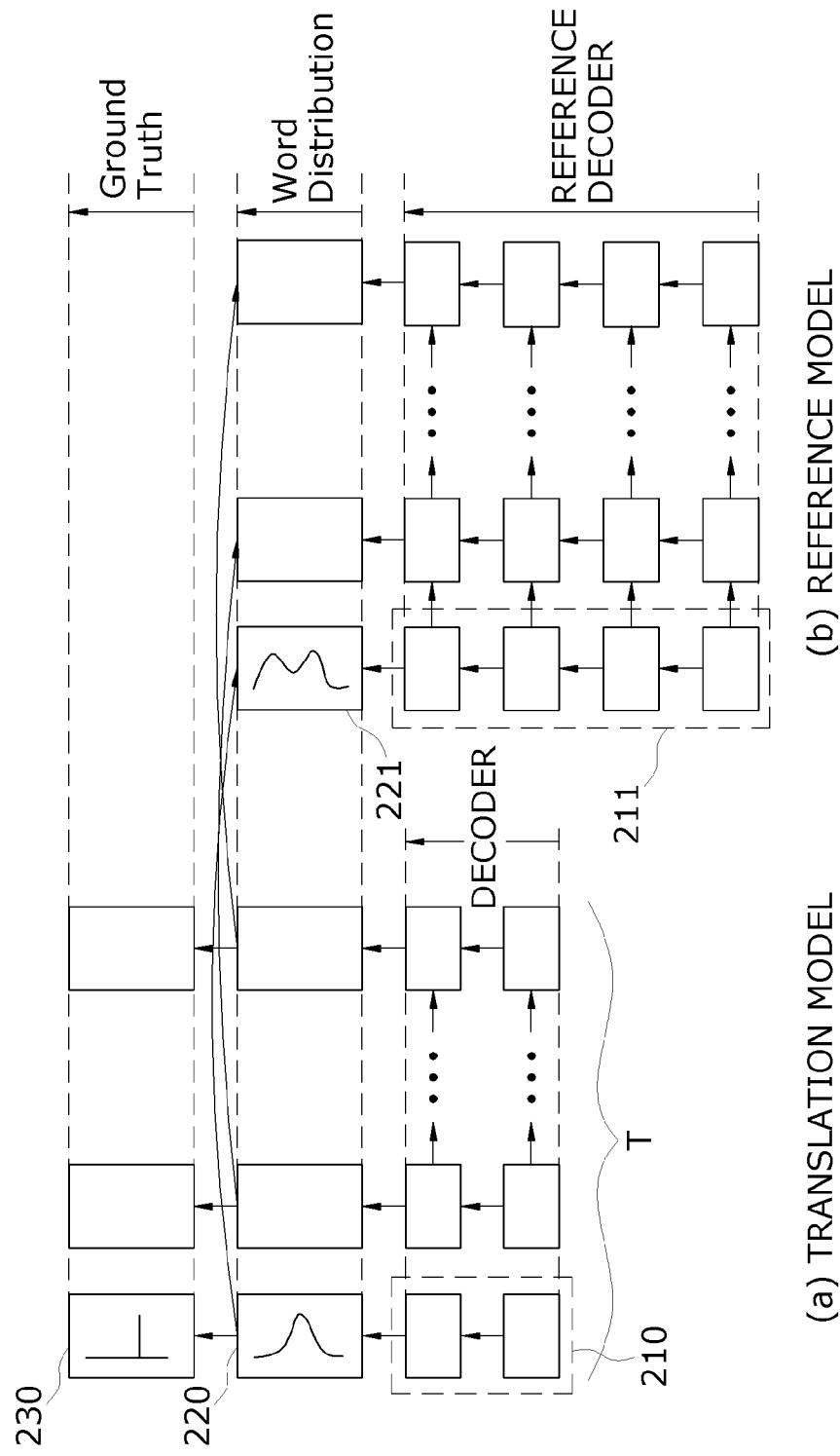

METHOD AND APPARATUS FOR CONSTRUCTING TRANSLATION MODEL INSTALLED ON A TERMINAL ON THE BASIS OF A PRE-BUILT REFERENCE MODEL

CROSS-REFERENCE TO RELATED APPLICATION

This application claims priority to and the benefit of Korean Patent Application No. 10-2019-0013591, filed on Feb. 1, 2019, the disclosure of which is incorporated herein by reference in its entirety.

BACKGROUND

1. Field of the Invention

The present invention relates to a method and apparatus for constructing a translation model, and more specifically, to a method and apparatus for constructing a compact translation model that can be installed on a terminal on the basis of a pre-built reference model.

2. Description of Related Art

Recently, as neural translation models have delivered a higher performance in translation compared to the conventional rule-based translation models and statistical-based translation models, translation and interpretation services based on neural translation models are being actively provided. However, in order for the neural translation model to outperform the existing translation models, tens of millions of parameters and a large matrix operation corresponding thereto are required. Accordingly, the neural translation model requires a high memory capacity and a high level of computation performance and has difficulty in providing a neural network-based translation service in a terminal environment such as an embedded system.

In addition, the most existing neural network-based services are provided in a client-server method due to having a large-sized neural model and due to requirements for great computation performance. Use of neural network-based services forcibly requires network connection. However, translation and interpretation services need to be utilized even in an environment where network connection is unstable, so there is a need for a translation and interpretation service that is available for use without a network connection.

On the other hand, the environment of a terminal is limited in network, memory, and computing performance as compared to a desktop computer environment. Such a terminal environment requires a small translation model that provides translation accuracy and speed corresponding to those of a graphics processing unit (GPU)-based neural network model.

SUMMARY OF THE INVENTION

The present invention is directed to providing a method and apparatus for constructing a compact translation model applicable to a terminal.

The present invention is directed to providing a method and apparatus for constructing a translation model capable of ensuring translation accuracy and speed in a terminal environment that is limited in network, memory, and computation performance.

The technical objectives of the present invention are not limited to the above, and other objectives may become apparent to those of ordinary skill in the art based on the following descriptions.

According to an aspect of the present invention, there is provided a method of constructing a translation model including at least one hidden layer, the method including imitation learning a parameter distribution with respect to a word probability distribution of a pre-built reference model and imitation learning a tree search structure of the reference model.

The imitation learning the parameter distribution may include imitation learning a reference model parameter for determining the word probability distribution of the reference model using a loss function defined with respect to a word probability distribution of the at least one hidden layer of the translation model.

The loss function may include a first loss function corresponding to a cross entropy of a word probability distribution of the translation model and a ground-truth distribution.

The loss function may include a second loss function corresponding to a cross entropy of a word probability distribution of the translation model and the word probability distribution of the reference model.

The imitation learning the parameter distribution may include adjusting a model parameter for determining the word probability distribution of the at least one hidden layer such that the loss function is minimized.

The hidden layer may include a series of hidden state vectors, wherein the imitation learning the tree search structure may include allowing the last hidden layer of the translation model to imitation learn a last hidden layer of the reference model using a third loss function defined with respect to the series of hidden state vectors and a trainable matrix.

The third loss function may be a function of a distance between the hidden state vector and a hidden state vector of the last hidden layer of the reference model.

The imitation learning the tree search structure may include adjusting the hidden state vector and the trainable matrix such that the third loss function is minimized.

The trainable matrix may have a size determined by a dimension of the hidden state vector and a hidden state vector of the last hidden layer of the reference model.

The translation model may further include an input layer and an output layer, the method further including pruning parameters of the input layer, the at least one hidden layer, and the output layer according to an importance thereof and quantizing the parameters for each of the input layer, the at least one hidden layer, and the output layer.

The method may further include performing re-learning on the translation model on the basis of the pruned and quantized parameters.

Each hidden layer may be represented by a series of hidden state vectors, wherein the translation model may include hidden layers of which the number is less than the number of hidden layers of the reference model, and the hidden state vector of the translation model may be represented in a dimension lower than a dimension of the hidden state vector of the reference model.

According to another aspect of the present invention, there is provided a method of constructing a translation model on the basis of a pre-built reference model, the method including imitation learning a parameter distribution with respect to a word probability distribution of the reference model using a loss function defined with respect to a word probability distribution of at least one hidden layer of a translation model and imitation learning a tree search structure of the reference model using a third loss function defined with respect to a series of hidden state vectors representing each of the at least one hidden layer and a trainable matrix.

The imitation learning the parameter distribution and the imitation learning the tree search structure may be performed simultaneously.

According to another aspect of the present invention, there is provided an apparatus for constructing a translation model on the basis of a pre-built reference model, the apparatus including an imitation learning unit configured to imitation learn a parameter distribution with respect to a word probability distribution of the reference model and a tree search structure of the reference model and generate an imitated translation model a pruning and quantizing unit configured to prune and quantize parameters of each layer of the imitated translation model according to an importance thereof and a re-learning unit configured to optimize the pruned and quantized translation model by performing model re-learning

BRIEF DESCRIPTION OF THE DRAWINGS

FIG. 2 illustrates an imitation learning process of a parameter distribution according to an embodiment of the present invention.

DETAILED DESCRIPTION OF EXEMPLARY EMBODIMENTS

Hereinafter, the above and other objectives, advantages and features of the present invention and manners of achieving them will become readily apparent with reference to descriptions of the following detailed embodiments when considered in conjunction with the accompanying drawings.

Hereinafter, exemplary embodiments of the present invention will be described in detail with reference to the accompanying drawings.

A neural translation model schematically includes an embedding layer for abstracting an input token (a word); a recurrent neural network (an encoder) for abstracting an input sentence to form a sentence vector; and a recurrent neural network (a decoder) for receiving as an input the sentence vector and an output word vector and a hidden state vector of a previous step to output a word of a current step.

In order to improve translation performance, the neural translation model outputs a certain number of words corresponding to a tree size of each step using a tree search structure (Beam Search) and selects a word having the highest probability.

The method and apparatus for constructing a translation model according to the present invention compresses a reference model by modifying a recurrent structure of a neural translation model for outputting a translation result through a recurrent structure that uses an output word of a previous step as an input word of a next step, thereby constructing a compact translation model.

Such a neural network model has a characteristic in that a neural network model which is additionally trained from pre-trained parameters has a performance that is improved more than a neural network model trained from randomly initialized parameters. By using such a characteristic, the present invention learns a large translation model (a teacher model) and allows a compact translation model (a student model) to imitation learn the learned large translation model serving as a reference model.

The reference model and the compact translation model are neural translation models each including at least one hidden layer. For example, the reference model may be a neural translation model composed of four hidden layers having 1000-dimensional state vectors, and the translation model that imitation learns the reference model may be a neural translation model composed of two hidden layers having 300-dimensional state vectors.

The method and apparatus for constructing a translation model according to the present invention constructs a translation model by miniaturizing the size and the tree search structure of a pre-built reference model. To this end, the method and apparatus according to the present invention performs an imitation learning process of transferring learned knowledge of a pre-built reference model to a translation model.

Figure 1:
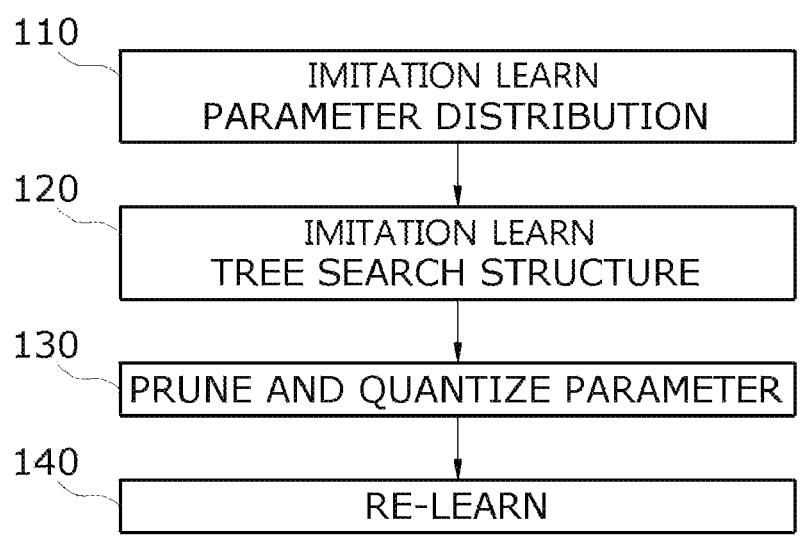
FIG. 1 is a flowchart illustrating a process of a method of constructing a translation model according to an embodiment of the present invention.

FIG. 1 is a flowchart showing a process of a method of constructing a translation model according to an embodiment of the present invention.

The method of constructing a translation model according to the embodiment of the present invention includes imitation learning a pre-built reference model. In detail, the method of constructing a translation model according to the embodiment of the present invention includes imitation learning a parameter distribution with respect to a word probability distribution of a pre-built reference model (110) and imitation learning a tree search structure of the reference model (120). Since the operation 110 of imitation learning a parameter distribution and the operation 120 of imitation learning a tree search structure can be defined with a loss function, the operations 110 and 120 can be performed simultaneously.

In addition, the method of constructing a translation model according to the embodiment of the present invention includes pruning and quantizing parameters to remove unnecessary parameters (130) and re-learning so as to optimize a translation model (140).

Hereinafter, each operation of FIG. 1 will be described in detail with reference to FIGS. 2 to 4. FIG. 2 illustrates an imitation learning process of a parameter distribution according to an example of the present invention.

In FIG. 2, a process in which a translation model imitation learns a parameter distribution of a reference model is illustrated in relation to a decoder. Such a process corresponds to the operation 110 of imitation learning a parameter distribution as introduced above with reference to FIG. 1.

For example, a decoder of a translation model (a) includes P hidden layers 210 having N-dimensional nodes and a decoder of a reference model (b) includes Q hidden layers 211 having M-dimensional nodes. Here, M is greater than or equal to N (M≥N), and Q is greater than or equal to P (Q≥P). T is the number of words (tokens) in an input sentence currently desired to be translated, and t is a step index which is used to refer to a word (a token) of the input sentence by steps. (1≤t≤T)

The probability distribution for the word of the input sentence corresponding to the current step t may be obtained from the last hidden layer of the decoder. For example, the probability distribution for the input sentence of the reference model (b) may be obtained from the highest hidden layer among the Q hidden layers 211 shown in the drawing.

The operation 110 of imitation learning a parameter distribution includes imitation learning a reference model parameter for determining the word probability distribution of the reference model (b) using a loss function defined with respect to a word probability distribution of at least one hidden layer 210 of the translation model. The learning of the neural translation model is achieved by a process of adjusting the loss function. That is, the neural translation model learns by adjusting a model parameter such that the loss function is minimized. According to the method of constructing a translation model according to the present invention, in the operation 110 of imitation learning a parameter distribution, the model parameter for determining the word probability distribution of at least one hidden layer is adjusted such that the loss function is minimized.

The loss function is a function corresponding to an error between the word probability distribution of the translation model (a) and a ground-truth distribution. For example, the loss function is a function such as a cross entropy error function or a mean squared error function.

In one example, the loss function includes a first loss function corresponding to the cross entropy of the word probability distribution and the ground-truth distribution. The first loss function is defined as a cross entropy of a word probability distribution 220 of the translation model (a) and a ground-truth distribution 230 at the current step t, which is denoted as $Loss_1$ in Equation 1 below.

$$Loss_1 = -\Sigma_{t=1}^{T}\Sigma_{k=1}^{|V|} 1\{y_t=k\} \times \log p(y_t=k|x;\theta) \quad \text{[Equation 1]}$$

In the above equation, t is a step index, T is the number of words in an input sentence currently desired to be translated, $|V|$ is the total number of words in a vocabulary, which is a set of words understood by the translation model, and k is a word index. $1\{y_t=k\}$ denotes a ground-truth distribution 230 at step t, x denotes an input sentence, and $\theta$ denotes a parameter of the translation model (a). p is a word probability distribution 220 of a hidden layer of the translation model (a), which represents a function of the probability of a case when a word of the input sentence x at step t corresponds to a word index k (i.e., $y_t=k$). In one example, the operation 110 of imitation learning a parameter includes adjusting the parameter $\theta$ of the translation model (a) such that the first loss function $Loss_1$ is minimized. That is, the operation 110 of imitation learning a parameter includes determining a parameter $\theta$ of the translation model (a), in which the first loss function $Loss_1$ is minimized, to have an optimum weight value.

The loss function also includes a second loss function corresponding to the cross-entropy of the word probability distribution of the translation model (a) and the word probability distribution of the reference model (b). The second loss function is defined as a cross entropy of the word probability distribution 220 of the translation model (a) and the word probability distribution 221 of the reference model (b) for the translation model (a) to imitation learn the parameter distribution of the reference model (b), and may be expressed as $Loss_2$ in Equation 2 below.

$$Loss_2 = -\Sigma_{t=1}^{T}\Sigma_{k=1}^{|V|} q\{y_t=k|x;\theta_R\} \times \log p(y_t=k|x;\theta) \quad \text{[Equation 2]}$$

In Equation 2, $\theta_R$ denotes a parameter of the reference model (b), and q denotes a word probability distribution 221 of a hidden layer of the reference model (b). The word probability distribution 221 of the reference model (b) contains a larger amount of information than that of the ground-truth distribution 230, which may help the translation model (a) to perform learning. In one example, the operation 110 of imitation learning a parameter adjusts the parameter $\theta$ of the translation model (a) such that the second loss function $Loss_2$ is minimized. That is, the operation of imitation learning a parameter distribution includes determining a parameter $\theta$ of the translation model (a), in which the second loss function $Loss_2$ is minimized, to have an optimum weight value.

In the operation 110, the parameter distribution for the word probability distribution of the reference model is imitation learned using the loss function defined with respect to the word probability distribution of at least one hidden layer of the translation model. In one example, the operation 110 of imitation learning a parameter may include adjusting the parameter $\theta$ of the translation model (a) such that the sum of the first loss function $Loss_1$ and the second loss function $Loss_2$ is minimized.

Figure 3A:
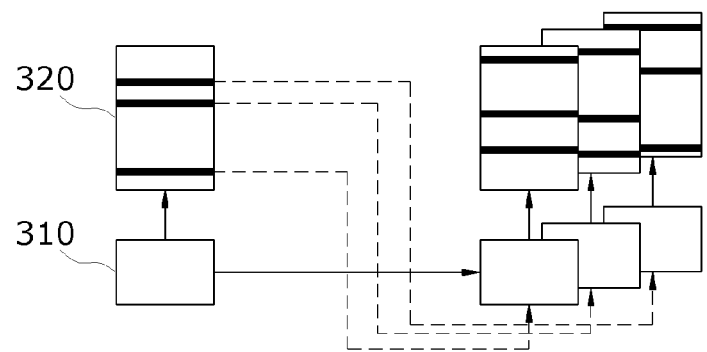
FIGS. 3A-3C illustrate a tree search structure of a reference model.
Figure 3B:
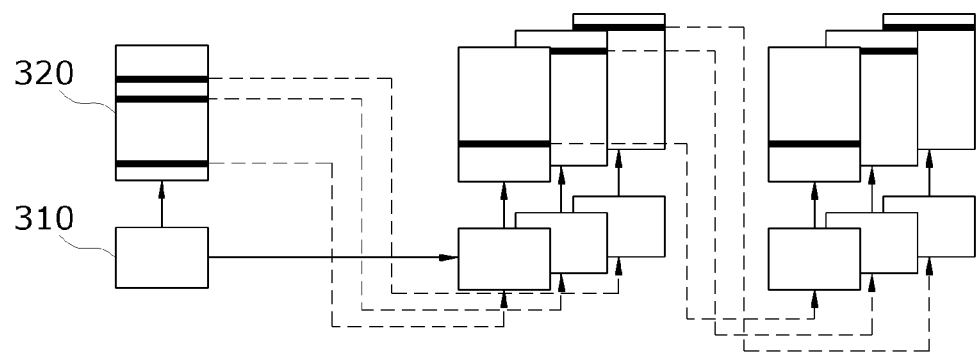
Figure 3C:
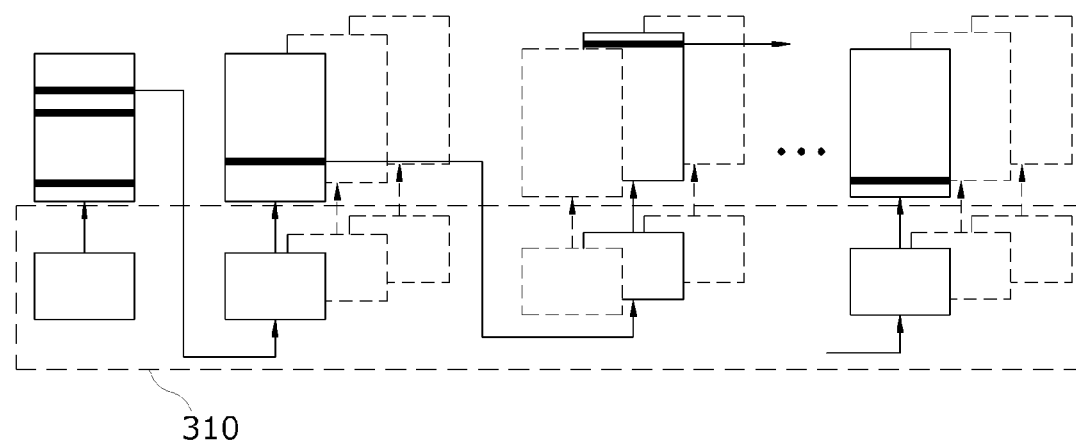

FIGS. 3A-C illustrate a tree search structure of the reference model.

The reference model selects a word having a highest probability of the tree at each step to improve the translation performance. The tree search structure of FIGS. 3A-C illustrate a tree structure having a size K which is 3.

In the first tree search step (FIG. 3A), the word probability distribution is determined from a last hidden layer node 310 of the decoder of the reference model, and K words (for example, K=3) having the highest probability are selected from the determined word probability distribution. Here, the number of words to be selected corresponds to the predetermined tree size K (for example, K=3). The output K words form separate tree paths. For example, the selected three words are respectively illustrated as three bold lines in a tree node 320.

Thereafter, words of the next step are output by a recurrent neural network (RNN) that has the selected K words and a previous hidden state vector as an input. That is, on the basis of the selected K words and the previous hidden state vector, K words having the highest probability at the next step are selected from each of the selected K words. Accordingly, the number of output words in the next step reaches $K^2$ which is the square of the tree size. For example, the first tree search step (FIG. 3A) includes outputting $3^2$ words in the next step for the three words selected in the previous step.

The second tree search step (FIG. 3B) includes selecting K words having the highest probability among the $K^2$ words output for the K words selected in the first tree search step (FIG. 3A) and pruning the remaining unselected words from the tree. For example, with reference to the second tree search step (FIG. 3B), three words having the highest probability among $3^2$ words output in the first tree search step (FIG. 3A) are selected, and the remaining unselected six words are pruned from the tree. In one example, the second tree search step (FIG. 3B) includes, among the output $K^2$ words, for each of the respective K words selected in the first tree search step (FIG. 3A), selecting one word having the highest probability to leave a total of K words and trim the remaining $K^2-K$ words from the tree. The selected K words form separate tree paths. That is, the number of tree paths may remain K due to the pruning.

Thereafter, in the second tree search step (FIG. 3B), K words having the highest probability are selected from the K words that were not pruned and survive, on the basis of the survived K words and the previous hidden state vector. That is, a total of $K^2$ words is output again.

The first tree search step (FIG. 3A) and the second tree search step (FIG. 3B) are repeated until a termination condition is satisfactory for the K tree paths. For example, the termination condition may be defined as a case when a symbol indicating the end of a sentence is output, or when the length of the path exceeds a length which is designated in advance.

In the third tree search step (FIG. 3C), when all of the K tree paths are terminated by satisfying the termination condition, the word probabilities of all the steps for each path are summed, and one path having the highest probability is selected, and the selected one path is output as a final result. The third tree search step (FIG. 3C) shows one path selected as a final result of the reference model, in which bold-lined beams respectively determine selected words, and the finally selected one path determines a sentence that is to be output as a translation result. In one example, a linked list of nodes 310 in the third tree search step (FIG. 3C) corresponds to a hidden layer of the reference model.

Figure 4:
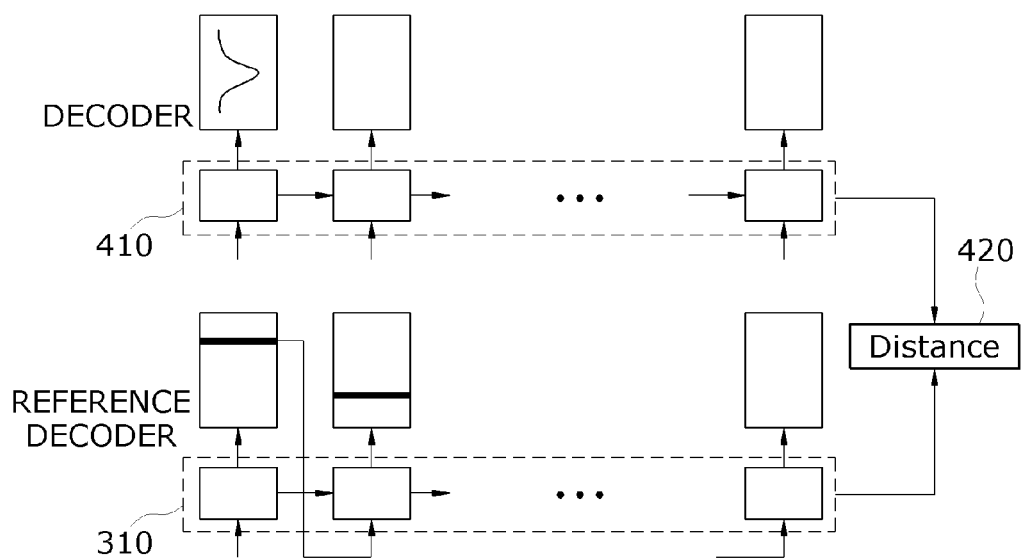
FIG. 4 illustrates an imitation learning process of a tree search structure according to an embodiment of the present invention.

FIG. 4 illustrates an imitation learning process of a tree search structure according to an embodiment of the present invention. In FIG. 4, a method that a compact translation model learns a tree search structure of a reference model described above with reference to FIG. 3 is illustrated.

The translation model includes at least one hidden layer, and each hidden layer is represented by a series of hidden state vectors. The translation model includes hidden layers of which the number is less than the number of hidden layers of the reference model, and the hidden state vector of the translation model is represented in a dimension lower than that of the hidden state vector of the reference model.

Information about the tree search structure of the reference model is contained in the hidden layer 310 of the decoder of the reference model. Accordingly, referring to FIG. 1, the operation 120 of imitation learning a tree search structure of the reference model includes learning the tree search structure of the reference model by allowing a hidden layer 410 of the decoder of the translation model to imitate the hidden layer 310 of the decoder of the reference model.

In the operation 120 of imitation learning a tree search structure, the imitation learning between the hidden layer 310 of the reference model and the hidden layer 410 of the translation model is performed by defining the distance 420 between the hidden state vectors of the last hidden layers at each step as a third loss function and minimizing the third loss function. Here, in order to compare the distance 420 between the hidden state vectors, the hidden state vector of the reference model needs to have the same dimension as that of the translation model. Accordingly, a trainable matrix is multiplied by the hidden state vector of the reference model such that the reference model and the translation model have the same dimension.

When the reference model and the translation model have the same dimension of hidden state vectors, the distance between the hidden state vector of the reference model and the hidden state vector of the translation model for each step can be calculated by various distribution distance measurement methods. For example, cosine distance measurement, Euclidean distance measurement, or Kullback-Leibler (KL) divergence measurement may be used.

In one example, when the distance between the hidden state vector of the reference model and that of the translation model is measured using Euclidean distance, the third loss function $Loss_3$ for the operation 120 of imitation learning a tree search structure may be defined as follows.

$$Loss_3 = -\Sigma_{t=1}^{T} \|Wh_t^R - h_t^S\|_2 \qquad \text{[Equation 3]}$$

In Equation 3, W denotes a trainable matrix for matching the dimensions of the hidden state vectors, $h_t^R$ denotes the hidden state vector of the reference model at step t, and $h_t^S$ denotes the hidden state vector of the translation model at step t.

In one example, the size of the trainable matrix W is determined by the dimension of the hidden state vector of the last hidden layer of the translation model and the dimension of the hidden state vector of the last hidden layer of the reference model. For example, when the hidden state vector of the reference model has a dimension of 1000 and the hidden state vector of the translation model has a dimension of 500, the size of the matrix W is determined to be (1000,500).

That is, the hidden layer of the translation model includes a series of hidden state vectors, and the operation 120 of imitation learning a tree search structure includes allowing the last hidden layer of the translation model to imitation learn the last hidden layer of the reference model using the third loss function $Loss_3$ defined with respect to the series of hidden state vectors $h_t^S$ of the hidden layer of the translation model and the trainable matrix W. Here, the third loss function $Loss_3$ corresponds to the distance between the hidden state vector $h_t^S$ of the last hidden layer of the translation model and the hidden state vector $h_t^R$ of the last hidden layer of the reference model.

The operation 120 of imitation learning a tree search structure includes adjusting the hidden state vector $h_t^S$ of the last hidden layer of the translation model and the trainable matrix W such that the third loss function $Loss_3$ is minimized. In the operation 120, the tree search structure of the reference model is imitation learned using the third loss function defined with respect to the series of hidden state vectors representing each hidden layer and the trainable matrix.

In one example, for the method of constructing a translation model, the first loss function $Loss_1$ for data learning, the second loss function $Loss_2$ for imitation learning of parameter distribution, and the third loss function $Loss_3$ for tree search structure may be employed simultaneously. In this case, the total loss function Loss may be defined by Equation 4 below.

$$\text{Loss} = Loss_1 + Loss_2 + Loss_3 = \qquad \text{[Equation 4]}$$
$$-\sum_{t=1}^{T} \left\{ \|Wh_t^R - h_t^S\|_2 + \sum_{k=1}^{|V|} [1\{y_t = k\} + q\{y_t = k \mid x; \theta_R\}] \times \log p(y_t = k \mid x; \theta) \right\}$$

The translation model, which is completed with learning through the operation 110 of imitation learning a parameter distribution and through the operation 120 of imitation learning a tree search structure, corresponds to a first-order compact model of the reference model. Such a translation model may output a high-quality translation result only by using a greedy search method (tree size=1) without generating a tree search structure in the translation operation. In addition, since the translation model constructed according to the present invention does not need to perform a tree search to output a number of words corresponding to the tree size of each step and then select a word having the highest probability, the translation time required for translation is greatly shortened. Accordingly, the method of constructing a translation model according to the present invention can miniaturize the reference model through the operation 110 of imitation learning a parameter distribution and can efficiently compress the tree search structure of the reference model without degrading the translation performance through the operation 120 of imitation learning a tree search structure.

Referring again to FIG. 1, the method for constructing a translation model according to the present invention includes pruning and quantizing a parameter to remove an unnecessary parameter (130).

The translation model includes at least one hidden layer, an input layer, and an output layer. The operation 130 of pruning and quantizing a parameter includes pruning parameters of each of the input layer, the at least one hidden layer, and the output layer according to an importance thereof, and quantizing parameters remaining after the pruning at each step.

The layer-specific parameter pruning, which is one of the neural network miniaturization methods, is a method of removing a low valued parameter or node at each layer which reduces the size of the neural translation model but not the size of the search tree. Accordingly, a direct application of the layer-specific parameter to the neural translation model does not provide a miniaturization effect. In addition, in the neural translation model, a word-associated layer (embedding parameters, Softmax parameters, etc.) exerts a great influence on the translation performance, and thus the technique of pruning a predetermined number of parameters at each layer is not suitable for being applied to the neural translation model.

In the method of constructing a translation model according to the embodiment of the present invention, the operation 130 of pruning and quantizing a parameter includes performing a layer-irrespective parameter pruning rather than a layer-specific parameter pruning in consideration of characteristics of a layer coming in contact with input and output words of a neural translation model. Such a layer-irrespective parameter pruning prevents information loss of input and output words and reduces performance degradation in the neural translation model caused when errors are transmitted at each translation step.

In detail, the operation 130 of pruning and quantizing a parameter includes pruning a parameter having a value lower than or equal to a predetermined value among parameters assigned to links between hidden nodes of at least one hidden layer of the translation model (the first-order compact model) constructed through the operation 110 of imitation learning a parameter distribution and the operation 120 of imitation learning a tree search structure. The first-order compact model constructed through the operation 110 and the operation 120 has hidden nodes whose dimension is lowered more than that of the reference model but still has an unnecessary link (i.e., a parameter) between the hidden nodes. Since a very small parameter exerts almost no influence on the hidden state vector value, a parameter having a value lower than or equal to a predetermined value (a threshold value) may be pruned.

The operation 130 of pruning and quantizing a parameter may include pruning parameters of an input layer (an embedding layer) and an output layer (i.e., a Softmax layer). However, when input and output layers coming in direct contact with input and output words are subject to parameter pruning, the input and output layers may have a performance degradation to a greater degree than that of an encoder or decoder layer constituted of at least one hidden layer. In addition, generally, the input and output layers have a parameter larger than that of the encoder or decoder layer. Accordingly, in the method of constructing a translation model according to the embodiment of the present invention, the operation 130 of pruning and quantizing a parameter includes arranging all parameters of all layers according to sizes without distinguishing the layers and pruning a lower-level parameter having a smaller size. For example, a predetermined portion or a predetermined number of parameters among low-level parameters are pruned. As such, since a predetermined number of parameters are pruned with respect to the respective layers, a parameter of the input layer or output layer is prevented from being pruned due to being larger than those of the encoder and decoder layers.

The operation 130 of pruning and quantizing a parameter also includes performing parameter quantization on the translation model that is completed with the pruning. The operation 130 of pruning and quantizing a parameter includes determining a minimum value and a maximum value of a parameter of each layer, performing N-bit quantization on an interval between the minimum value and the maximum value, and mapping each parameter to the closest quantization value. The parameter quantization leads to a higher compression ratio and faster computation.

In addition, the method of constructing a translation model according to the invention also includes performing a re-learning (fine-tuning) on the translation model on the basis of the parameter pruned and quantized in the operation 130. The operation 140 of re-learning includes performing a model re-learning with respect to the same training data on the basis of the pruned and quantized parameter such that the translation model is optimized.

In the operation 140 of re-learning, since the learning is performed by a graphic processing unit (GPU), a sparse matrix calculation is not performed to secure the learning speed, but instead a dense matrix computation is performed by fixing the parameter pruned in the operation 130 and preventing a gradient from being transmitted to the pruned parameter. In addition, since the gradient is very small, the value of the gradient may vanish in the course of quantization. Accordingly, in the operation 140 of re-learning, the gradient calculation may be computed as a real number having the same bits as those of a model before the quantization. In addition, the parameter may be updated according to the calculated gradient and then be subject to quantization again.

An apparatus for constructing a translation model according to an embodiment of the present invention constructs a translation model on the basis of a pre-built reference model. The apparatus for constructing a translation model includes an imitation learning unit configured to imitation learn a parameter distribution of a word probability distribution of the reference model and a tree search structure of the reference model; a pruning and quantizing unit configured to prune and quantize a parameter of the imitated translation model at each step according to an importance thereof; and a re-learning unit configured to optimize the pruned and quantized translation model by performing model-re-learning. For example, the imitation learning unit, the pruning and quantizing unit, and the re-learning unit may each be a microprocessor, such as a GPU or a central processing unit (CPU). For example, the imitation learning unit, the pruning and quantizing unit, and the re-learning unit may each be a computer system.

In addition, the apparatus for constructing a translation model may include a storage unit for storing training data and the like. For example, the storage unit may be a physical storage medium, such as memories, hard disks, databases, and the like, or a database system, The imitation learning unit performs the operations 110 and 120 described with reference to FIG. 1. The pruning and quantizing unit performs the operation 130. The re-learning unit performs the operation 140.

Meanwhile, the method and apparatus for constructing a translation model according to the embodiment of the present invention may be implemented in a computer system or may be recorded in a recoding medium. The computer system may include at least one processor, a memory, a user input device, a data communication bus, a user output device, and a storage. The above described components perform data communication through the data communication bus.

The computer system may further include a network interface coupled to a network. The processor may be a CPU or a semiconductor device for processing instructions stored in the memory and/or storage.

The memory and the storage may include various forms of volatile or nonvolatile media. For example, the memory may include a read only memory (ROM) or a random-access memory (RAM).

The method of constructing a translation model according to the embodiment of the present invention may be implemented in the form executable by a computer. When the method of constructing a translation model according to the embodiment of the present invention is performed by the computer device, instructions readable by the computer may perform the method of constructing a translation model according to the present invention.

Meanwhile, the method of constructing a translation model according to the embodiment of the present invention may be embodied as computer readable codes on a computer-readable recording medium. The computer-readable recording medium is any data storage device that can store data that can be read thereafter by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable codes may be stored and executed in a distributed manner.

As is apparent from the above, a translation model that ensures translation accuracy and speed in a terminal environment limited in a computation performance can be provided. A pre-built reference model is miniaturized through a parameter imitation learning and is efficiently compressed through a tree search structure imitation learning without degrading the translation performance.

The method and apparatus for constructing a translation model according to the embodiment of the present invention may construct a compact translation model that may be mounted on a terminal. Such a compact translation model may be mounted on a portable interpretation device, such as a terminal type interpreter, a wearable interpreter or the like, and a mobile device, such as a smart phone, of which demand is recently increasing. In particular, a translation model constructed by the method and apparatus for constructing a translation model according to the present invention may provide high-quality translation even in an environment in which server-client communication is limited.

It should be understood that the present invention may not be limited to the embodiments but embodied in various forms within the scope of the technical spirit of the present invention. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the present invention has been described with reference to the embodiments, a person of ordinary skill in the art should appreciate that various modifications, equivalents, and other embodiments are possible without departing from the scope and sprit of the present invention. Therefore, the embodiments disclosed above should be construed as being illustrative rather than limiting the present invention. The scope of the present invention is not defined by the above embodiments but by the appended claims of the present invention, and the present invention is to cover all modifications, equivalents, and alternatives falling within the spirit and scope of the present invention.

What is claimed is:

1. A method of constructing a translation model including at least one hidden layer, the method comprising:
   performing an imitation learning process of transferring learned knowledge of a pre-built reference model to the translation model to thereby miniaturize a size and a tree search structure of the reference model,
   wherein the imitation learning process comprises:
   imitation learning a parameter distribution with respect to a word probability distribution of the pre-built reference model;
   imitation learning the tree search structure of the reference model; and
   imitation learning a reference model parameter for determining the word probability distribution of the reference model using a loss function defined with respect to a word probability distribution of the at least one hidden layer of the translation model,
   wherein the loss function comprises a first loss function corresponding to a cross entropy between a word probability distribution and a ground-truth distribution of the translation model, and a second loss function corresponding to a cross entropy between a word probability distribution of the translation model and the word probability distribution of the reference model,
   wherein the hidden layer comprises a series of hidden state vectors,
   wherein the imitation learning the tree search structure comprises allowing the last hidden layer of the translation model to imitation learn a last hidden layer of the reference model using a third loss function defined with respect to the series of hidden state vectors and a trainable matrix.

2. The method of claim 1, wherein the imitation learning the parameter distribution comprises adjusting a model parameter for determining the word probability distribution of the at least one hidden layer such that the loss function is minimized.

3. The method of claim 1, wherein the third loss function is a function of a distance between the hidden state vector and a hidden state vector of the last hidden layer of the reference model.

4. The method of claim 1, wherein the imitation learning the tree search structure comprises adjusting the hidden state vector and the trainable matrix such that the third loss function is minimized.

5. The method of claim 1, wherein the trainable matrix has a size determined by a dimension of the hidden state vector and a dimension of a hidden state vector of the last hidden layer of the reference model.

6. The method of claim 1, wherein the translation model further comprises an input layer and an output layer,
the method further comprises:
pruning parameters of the input layer, the at least one hidden layer, and the output layer according to an importance thereof; and
quantizing the parameters for each of the input layer, the at least one hidden layer, and the output layer.

7. The method of claim 6, further comprising performing re-learning on the translation model on the basis of the pruned and quantized parameters.

8. The method of claim 1, wherein each hidden layer is represented by a series of hidden state vectors,
wherein the translation model comprises hidden layers of which the number is less than the number of hidden layers of the reference model, and the hidden state vector of the translation model is represented in a dimension lower than a dimension of the hidden state vector of the reference model.

9. A method of constructing a translation model on the basis of a pre-built reference model, the method comprising:
imitation learning a parameter distribution with respect to a word probability distribution of the reference model using a loss function defined with respect to a word probability distribution of at least one hidden layer of a translation model, wherein the loss function comprises a first loss function corresponding to a cross entropy between a word probability distribution and aground-truth distribution of the translation model, and a second loss function corresponding to a cross entropy between a word probability distribution of the translation model and the word probability distribution of the reference model; and
imitation learning a tree search structure of the reference model by allowing the last hidden layer of the translation model to imitation learn a last hidden layer of the reference model using a third loss function defined with respect to a series of hidden state vectors representing each of the at least one hidden layer and a trainable matrix.

10. The method of claim 9, wherein the imitation learning the parameter distribution and the imitation learning the tree search structure are performed simultaneously.

11. An apparatus for constructing a translation model including at least one hidden layer on the basis of a pre-built reference model, the apparatus comprising:
an imitation learning unit configured to generate an imitated translation model by:
imitation learning a parameter distribution with respect to a word probability distribution of the reference model using a loss function defined with respect to a word probability distribution of at least one hidden layer of a translation model, wherein the loss function comprises a first loss function corresponding to a cross entropy between a word probability distribution and a ground-truth distribution of the translation model, and a second loss function corresponding to a cross entropy between a word probability distribution of the translation model and the word probability distribution of the reference model, and
imitation learning a tree search structure of the reference model by allowing the last hidden layer of the translation model to imitation learn a last hidden layer of the reference model using a third loss function defined with respect to a series of hidden state vectors of the at least hidden layer and a trainable matrix;
a pruning and quantizing unit configured to prune and quantize parameters of the imitated translation model according to an importance thereof; and
a re-learning unit configured to optimize the pruned and quantized translation model by performing re-learning on the translation model.

* * * * *